May 12, 1970  R. H. RILEY, JR  3,511,323
SONIC TOOL WITH GENERALLY UNDAMPED MOUNTING OF
NODAL PORTION OF TRANSDUCER
Filed Feb. 23, 1968  3 Sheets-Sheet 1
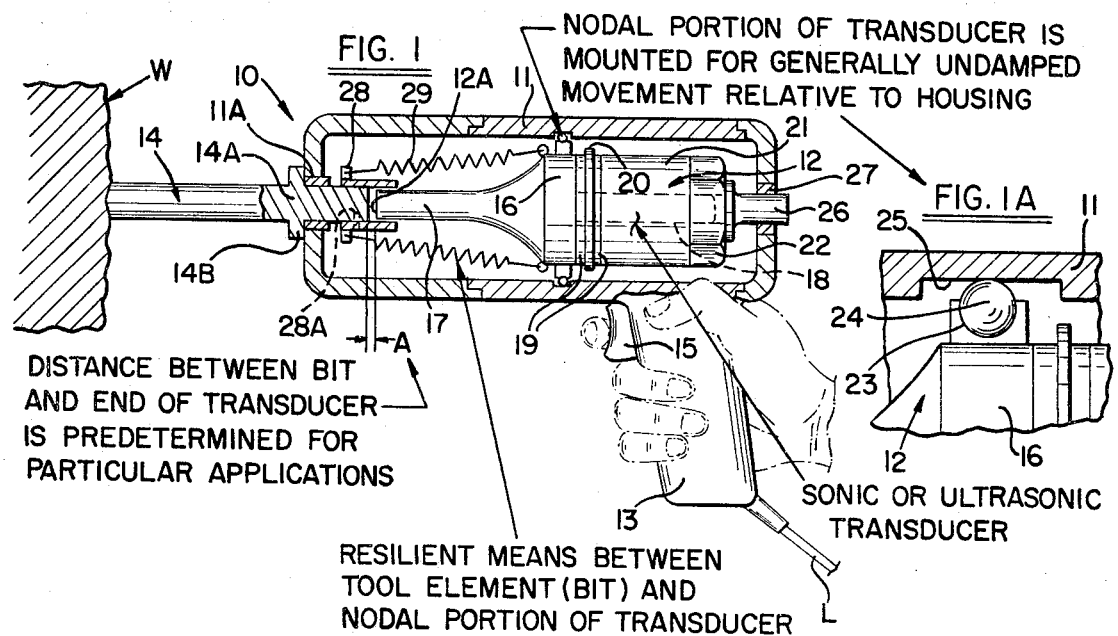
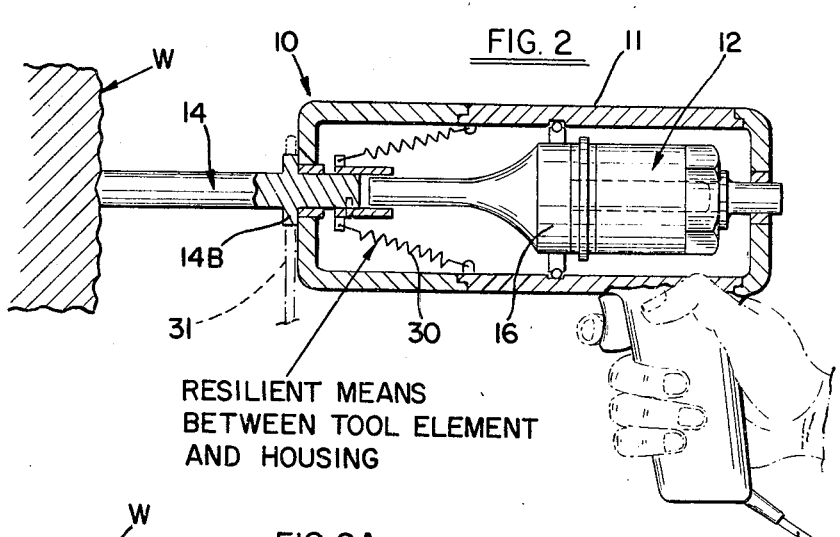
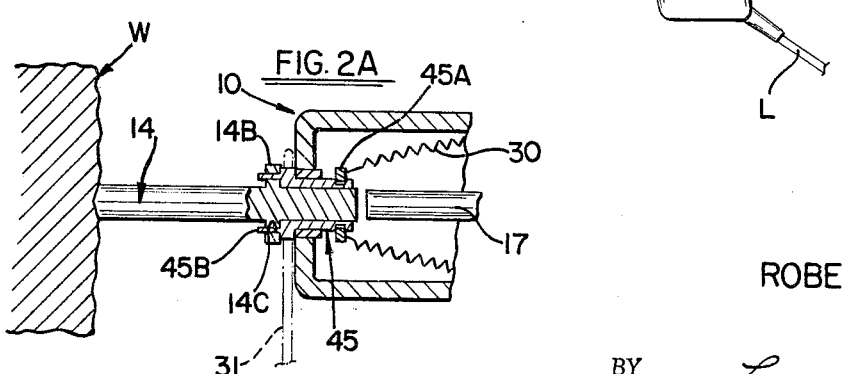
INVENTOR
ROBERT H. RILEY, JR.
BY  *Leonard Bloom*
ATTORNEY

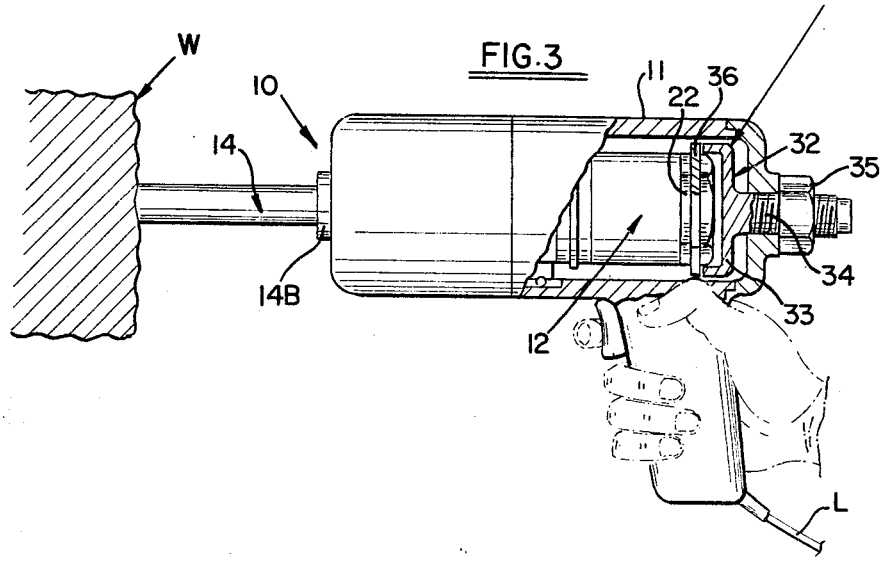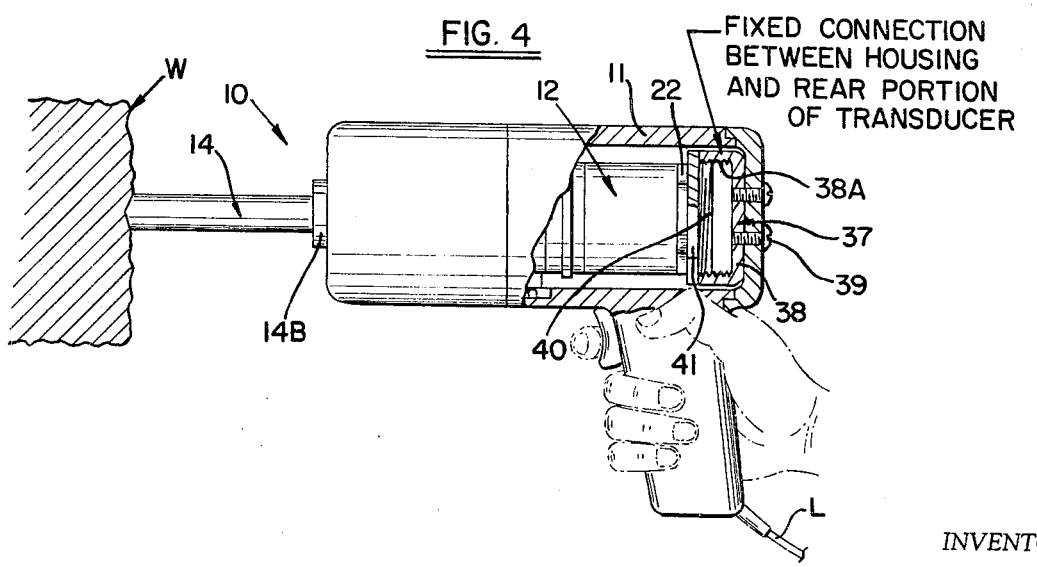

May 12, 1970 R. H. RILEY, JR 3,511,323
SONIC TOOL WITH GENERALLY UNDAMPED MOUNTING OF
NODAL PORTION OF TRANSDUCER
Filed Feb. 23, 1968 3 Sheets-Sheet 3

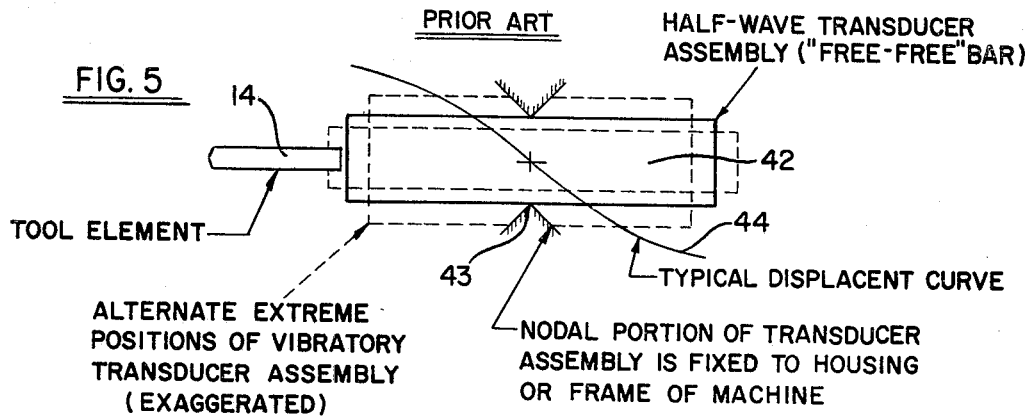

FIG. 5 — PRIOR ART
HALF-WAVE TRANSDUCER ASSEMBLY ("FREE-FREE" BAR)
TOOL ELEMENT — 14
ALTERNATE EXTREME POSITIONS OF VIBRATORY TRANSDUCER ASSEMBLY (EXAGGERATED)
NODAL PORTION OF TRANSDUCER ASSEMBLY IS FIXED TO HOUSING OR FRAME OF MACHINE
TYPICAL DISPLACENT CURVE

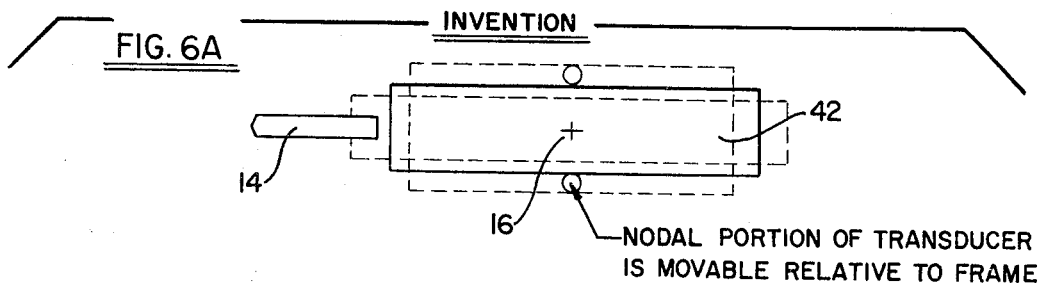

FIG. 6A — INVENTION
NODAL PORTION OF TRANSDUCER IS MOVABLE RELATIVE TO FRAME

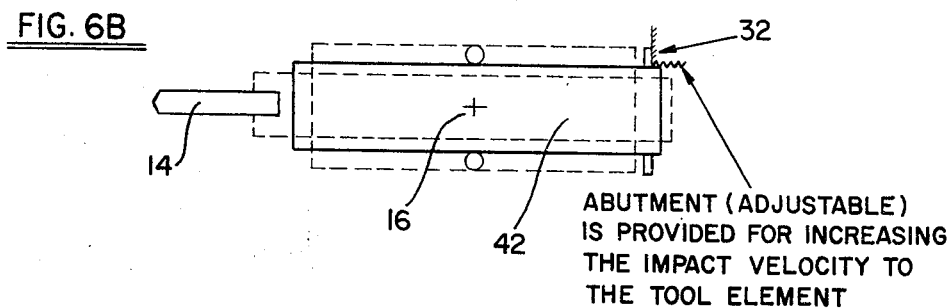

FIG. 6B
ABUTMENT (ADJUSTABLE) IS PROVIDED FOR INCREASING THE IMPACT VELOCITY TO THE TOOL ELEMENT

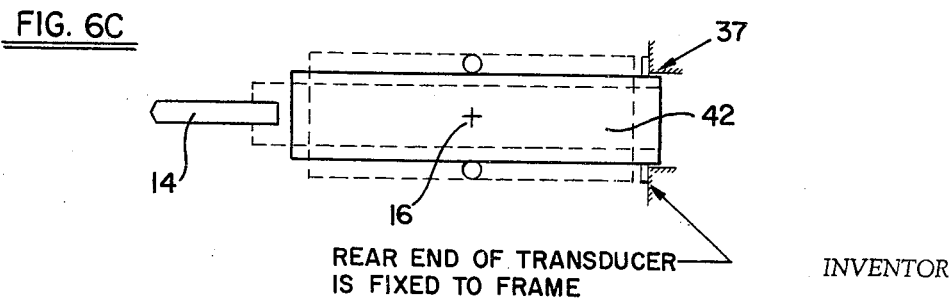

FIG. 6C
REAR END OF TRANSDUCER IS FIXED TO FRAME

INVENTOR
ROBERT H. RILEY, JR.
BY *Leonard Bloom*
ATTORNEY

United States Patent Office 3,511,323
Patented May 12, 1970

3,511,323
SONIC TOOL WITH GENERALLY UNDAMPED MOUNTING OF NODAL PORTION OF TRANSDUCER
Robert H. Riley, Jr., Towson, Md., assignor to The Black and Decker Manufacturing Company, Towson, Md., a corporation of Maryland
Filed Feb. 23, 1968, Ser. No. 707,597
Int. Cl. B25d 9/00, 11/00, 13/00
U.S. Cl. 173—117                     21 Claims

ABSTRACT OF THE DISCLOSURE

A sonic tool houses a transducer and has means mounting the nodal portion of the transducer to accommodate a generally undamped movement of the nodal portion relative to the tool housing, and in the direction of cyclic elastic deformation of the transducer, during the operation of the tool.

Introduction (the prior art)

A sonic tool (or other sonic or ultrasonic apparatus) employs a suitable transducer means to convert energy into a form intended to accomplish a desired end result. The transducer may be piezoelectric, magnetostrictive, or even mechanical, in which latter case the transducer may involve a so-called "orboresonant" oscillating system. Generally, the transducer comprises (or may be considered an integral part of) an overall resonant system characterized by respective nodes and anti-nodes of stress and velocity. A velocity node, for example, constitutes a region wherein the cyclic elastic deformations are at a minimum (at, or approaching zero) and generally may be referred to as the acoustically-nodal portion of the transducer; conversely, this is a region of maximum static stress, that is, a stress anti-node. Invariably, the transducer is mounted to the housing or frame of the machine at its acoustically-nodal portion, and this is a practice habitually resorted to in the prior art.

Statement of the invention

I have discovered, however, that if the nodal portion of the transducer is not fixed rigidly to the frame, or else is not damped by a friction-type of clamping means, but rather is allowed to have a movement relative to the frame, and in the direction of the major cyclic elastic deformations (or oscillations) of the transducer, that superior results may be obtained in transducer output or efficiency. Thus, while no deliberate attempt is made to shift the acoustical node relative to the effective or instantaneous acoustical length of the resonant transducer itself, yet the node may exhibit a cyclic vibration or oscillation relative to the frame of reference, that is, relative to the housing for the tool; and as a result, a relatively-lower frequency oscillation may be superimposed on the higher-frequency cyclic elastic deformations of the transducer for improved results in a given application of the sonic tool.

I have further discovered that if, in conjunction with this accommodated generally-undamped movement of the nodal portion of the transducer, the rearward end portion of the transducer (which is invariably unrestrained in the prior art) is allowed to engage with an adjustable abutment carried by the frame of the machine, or else is rigidly fixed to the frame, that additional improvements may be obtained. For example, where the sonic tool is adapted for masonry drilling operations, a significant increase may be obtained in the impact velocity of the series of relatively high-frequency low-amplitude blows delivered by the transducer to the work-engaging tool element.

Objects of the disclosure

Accordingly, it is an object of the present invention to provide a means for mounting the nodal portion of a transducer to accommodate a generally undamped movement of the nodal portion with respect to the housing of a sonic tool.

It is another object to mount a transducer for generally undamped movement relative to the tool housing in the direction of cyclic elastic deformation of the transducer, that is, in the direction of its major elastic oscillatory movement.

It is yet another object to provide a resilient means between the tool element and the transducer nodal portion, the latter being mounted for axial shifting movement relative to the generally longitudinally-disposed housing of the sonic tool.

It is a further object to deliberately superimpose a relatively lower-frequency longitudinal oscillation upon the higher-frequency cyclic elastic deformation of the transducer employed in a sonic or ultrasonic device.

It is a still further object to provide an adjustable abutment on a rearward wall of the housing for a sonic tool, the abutment engaging the normally-unrestrained rearward portion of the transducer during its cyclic elastic deformation, in conjunction with the accommodated generally-undamped movement of the nodal portion of the transducer.

It is a yet still further object to provide a transducer having its rearward end portion fixed to the housing, in conjunction with the accommodated generally-undamped movement of its nodal portion relative to the housing, thereby accentuating the movement of the forward portion of the transducer for increasing the impact velocity to the work-engaging tool element.

It is a yet still another object of the present invention to provide an inelastic mass-spring resonant vibratory system including at least one mass member (preferably the impacting mass member of a sonic tool) which itself comprises an elastic resonant oscillatory system exhibiting cyclic elastic deformations.

These and other objects will become apparent from a reading of the following specification, taken in conjunction with the enclosed drawings.

Description of the drawings

FIG. 1 is a side elevation, with parts broken away and sectioned, of one embodiment of the sonic tool of the present invention;

FIG. 1a is an enlarged detail of a portion of FIG. 1, showing one means for mounting the nodal portion of the transducer for generally undamped movement relative to the tool housing;

FIG. 2 is another embodiment, generally corresponding to the sonic tool of FIG. 1, but showing resilient means between the tool element and the housing;

FIG. 2a shows a preferred means for mounting the work-engaging tool element within the sonic tool of FIG. 2;

FIG. 3 is yet another embodiment, wherein an adjustable abutment is provided for the rear portion of the transducer;

FIG. 4 is a further embodiment, wherein the rear portion of the transducer is fixed to the tool housing;

FIG. 5 is a schematic illustration of a typical half-wave transducer assembly of the prior art, the broken lines indicating (to an exaggerated degree) the alternate extreme positions of the half-wave "free-free" bar exhibiting cyclic elastic deformations;

FIG. 6a is a schematic illustration, corresponding generally to that of FIG. 5, but showing the improved concept of the present invention, wherein the nodal portion of the transducer is mounted for generally undamped movement;

FIG. 6b is a schematic illustration of the yet another embodiment of the present invention, corresponding substantially to the embodiment of FIG. 3, wherein the normally-unrestrained end of the "free-free" bar is allowed to engage a fixed abutment, thereby increasing the impact velocity to the tool element; and FIG. 6c is a schematic illustration of the further embodiment of the present invention, corresponding substantially to the embodiment of FIG. 4, wherein the normally-unrestrained rear portion of the transducer is fixed to the housing.

General description

With reference to FIG. 1, there is illustrated a portable sonic hand tool 10 within which the teachings of the present invention may be incorporated. However, it will be appreciated by those skilled in the art that the teachings of the present invention are equally applicable to a wide variety of sonic or ultrasonic tools, devices and apparatus. With this in mind, the sonic tool 10 comprises a housing 11, a transducer means 12 within the housing, a suitable handle 13 adapted to be grasped by the operator, and a tool element 14 for receiving vibratory-type energy from the transducer means and transmitting this energy to the work W.

The housing may be of an insulated type, such as a glass-fiber reinforced polyester material if desired, and may comprise multiple axially-disposed housing sections suitably joined together as indicated on the drawing. The handle 13 may comprise a conventional pistol-grip handle, as shown, provided with a trigger 15 for controlling the energization of the tool. The tool is energized from the line cord L leading to a suitable power source, portions of which may be contained within the housing.

The tool element 14 may comprise a masonry-drilling bit, a wood-gouging bit, a scraping implement, or any other suitable work-engaging tool element. Preferably, the tool element 14 is loosely or removably mounted on the housing, and as shown on the drawing, is guided by means of a bearing sleeve 11a mounted in the forward wall of the housing. The tool element has a portion 14a extending within the housing for receiving a series of vibratory-type impacts from the transducer means, and further has a collar 14b in abutting engagement with the face of the tool housing. The work-engaging face of the tool element 14 is generally flat, being provided with a relatively shallow point for starting the tool element within the work; otherwise, the tool element may comprise a steel rod without any expensive carbide or diamond cutters, or without special fluted constructions, and this facilitates a considerable cost savings over the prior art methods.

With this overall arrangement, the forward thrust or bias is exerted by the operator on the handle, through the housing directly to the collar on the tool element, and through the tool element to the work; and thus any variations or excesses of operator bias are in a sense neutralized, and hence are precluded from overloading the transducer and otherwise interfering with the transducer output and efficiency. Moreover, the longitudinal or axial positioning of the impact-receiving portion 14a of the tool element and the impact-delivering end face 12a of the transducer means, in their respective mean of "at rest" positions relative to one another, is predetermined for the desired transfer of vibratory energy for the particular application of the sonic tool. In one embodiment, this axial positioning (denoted by a spacing or distance "A") is in the order of a few thousandths of an inch, and is exaggerated on the drawing for clarity of understanding. This spacing will vary for the particular application intended, and under certain conditions, the transducer and the tool element may be just touching one another. However, the construction of the sonic tool 10 and its method and theory of operation, form no part of the present invention, but are described and claimed more particularly in the co-pending Riley et al. application, Ser. No. 705,045, filed Feb. 13, 1968, entitled "Portable Sonic Hand Tool With Mean for Reducing the Effects of Operator Bias Upon Transducer Output and Efficiency," and assigned to the assignee of the present invention.

The transducer means 12 is preferably of the piezoelectric type; however, the teachings of the present invention are equally applicable to other types of transducer assemblies, such as magnetostrictive, fluidic, or mechanical, in which latter case the transducer may involve a so-called "orboresonant" oscillatory system. With this in mind, the transducer means 12 comprises an intermediate acoustically-nodal portion 16, an impedance-transforming "horn" portion 17 formed integrally with the nodal portion and extending forwardly therefrom, a necked-down central bolt 18 formed integrally with the nodal portion and extending rearwardly therefrom, a pair of washer-shaped piezo-electric transducer crystals or elements 19 piloted on the bolt and electrically insulated therefrom, a central contact ring 20 intermediate the piezoelectric crystals, the contact ring also being piloted on the bolt and electrically insulated therefrom, a spacer element 21, and a nut means 22 engaging the central bolt for retaining the assembly and for exerting an axial compressive bias or loading upon the piezoelectric elements. This compressive loading is habitually used in the prior art, as for example, in the now-expired patent to Heising, No. 2,044,000, and to Burkhardt, No. 2,368,609. Moreover, the electrical connections and switching means from the line L, through the trigger, to the piezoelectric elements are conventional, and hence have been omitted for clarity of understanding. Moreover, the particular construction of the transducer means 12 forms no part of the present invention, but rather is described and claimed more particularly in the McMaster et al. Pat. No. 3,368,085, entitled "Sonic Transducer," issued on Feb. 6, 1968.

Description of the present invention

In accordance with the teachings of the present invention, the substantially acoustically-nodal portion 16 of the transducer 12 is not fixed to the housing, or otherwise restrained by the housing, but rather is mounted to accommodate a generally-undamped movement relative to the housing.

Any suitable means may be employed for mounting the transducer for such movement of its nodal portion. With reference to FIG. 1a, however, a preferred mounting comprises a bearing cage 23 secured on the nodal portion 16 of the transducer, a plurality of balls or suitable anti-friction bearing elements 24 mounted in the cage, and an internal annular recess 25 formed in the housing to receive the balls, the recess having an axial length greater than that of the balls.

With further reference to FIG. 1, the transducer assembly has a pilot portion 26 formed integrally with the nut means 22 and slidably mounted in a bearing guide 27 mounted in the rear wall of the tool housing. Moreover, a flanged guide sleeve 28 is fixed to the extending portion 14a of the tool element by suitable means, such as by a detent-type member 28a engaging the portion 14a of the tool element as the tool element is positioned within the housing. The guide sleeve 28 slidably or loosely receives the horn portion 17 of the transducer assembly, thereby assuring that the tool element and the transducer assembly will be properly aligned with each other.

Resilient means, such as a spring 29 or its equivalent, may be provided between the tool element 14 and the nodal portion 16 of the transducer assembly, thereby constantly urging the collar 14b against the face of the tool housing, and the tool element and transducer assembly toward each other. One end of the spring 29 may be secured to the flanged portion of the guide sleeve 28, which in turn is suitably secured to the tool element.

With reference to FIG. 2, resilient means, such as a spring 30 or its equivalent, is provided between the tool element and the housing. Also, a means may be provided for turning or oscillating the tool element during its penetration within the work W. This means may be powered or hand manipulatable, the latter involving a turning wrench 31 as shown by the broken lines on the drawing. This is sometimes desirable, particularly where the sonic tool is employed for masonry drilling operations, and facilitates a continuous cleaning of the hole being drilled.

With reference to FIG. 2a, the guide sleeve 28 of FIG. 1 may be combined with the bearing sleeve 11a to form a spring-loaded axially-movable (but rotatable) flanged bearing bushing 45 having a rotatable connection 45a with the spring 30. The bushing abuts against the face of the housing (as shown) and has a forwardly-extending portion 45b which interlocks with a corresponding portion 14c of the tool element 14 (as by a bayonet-type of connection). Thus, the arrangement facilitates insertion of the tool element within the housing; the collar 14b on the tool element abuts against the flange on the bushing, which in turn is against the housing; the tool element 14 and the flanged bearing bushing 45 are interlocked for rotation in unison; and the spring 30 constantly urges the tool element and bushing rearwardly into the housing and towards the end of the transducer.

In the embodiment of FIG. 3, an adjustable abutment means 32 is mounted on the rearward wall of the tool housing 11. This abutment means preferably comprises a cup-shaped abutment member 33 mounted on a bolt 34, which in turn is threaded into the housing wall and is backed by a locking nut 35. Preferably, the abutment member 33 is recessed, as shown, so that it will abut against a radially-extending peripheral flange 36 formed integrally on the nut 22; thus the member 33 abuts against the normally-unrestrained rearward end portion of the transducer during its cyclic elastic elongation and contraction. With this arrangement, the flange 36 is acoustically transparent and does not interfere with the standing wave pattern of the resonant transducer structure; however, other forms of abutments are equally adaptable to the teachings of the present invention. Moreover, it will be appreciated that the axial spacing between the adjustable abutment means 32 and the transducer means 12 has been somewhat exaggerated on the drawing for ease of illustration.

In the embodiment of FIG. 4, the normally-unrestrained rearward end portion of the transducer is secured to the housing by suitable connection means, as at 37 on the drawing. This connection means 37 may comprise a cup-shaped securing member 38 secured to the rearward wall of the housing by screws 39. The nut 22 is similar to those of the other embodiments, but has a portion 40 which is turned-down slightly and threaded to engage internal threads 38a formed within the securing member 38. The member 38 then shoulders against a radially-extending peripheral flange 41 formed on the nut, thereby providing a rigid connection for the outer periphery of the normally-unrestrained rearward end potion of the transducer. Preferably, the flange 41 is acoustically transparent.

Operation

The structural concepts and underlying principles of the present invention, as distinguished from the prior art theories and practices, may be more clearly understood with reference to the schematic illustrations of FIGS. 5 and 6a–6c.

In the schematic illustration of the prior art in FIG. 5, a half-wave transducer may be considered as a "free-free" bar 42 having its ends unrestrained and further having its intermediate acoustically-nodal portion fixed relative to the frame of reference, as denoted generally at 43. Such a bar, or multiple thereof, exhibits cyclic elastic deformations, that is, the bar is being alternately elongated and contracted at a periodic frequency. This periodic frequency, for example, may be 200 cycles per second for a mechanical oscillator used in a resonant pile driver, or 10,000 cycles per second for the piezoelectric-type of transducer assembly. In addition to these alternate elongations and contractions, the bar will experience proportional changges in its cross-sectional dimensions in accordance with the well-known Poisson's ratio. Thus the alternate positions of the bar may be indicated by the broken lines in FIG. 5, and it will be appreciated by those skilled in the art, that these positions have been greatly exaggerated on the drawing for ease of illustration.

At the normally-unrestrained ends of the bar the oscillatory displacement (and/or velocity) is at a maximum; accordingly, these portions of the bar are regions of maximum velocity and minimum static stress, that is, a velocity antinode and a stress node, respectively. The curve 44 thus constitutes a typical displacement curve and indicates the axial oscillatory displacement of a finite portion of the transducing bar along the physical axial length thereof, which displacements may be acoustically magnified, if desired, by making part of the bar function as a mechanical impedance transformer (or "horn") as is well known in the art.

In a practical application, energy may be taken out of the bar at desired periodic intervals. For example, when the bar is being instantaneously elongated, it may be allowed to engage or impact against a suitable work-engaging tool element or bit 14, thereby delivering a series of vibratory-type impacts to the bit, and thereby transferring vibratory energy to the work. Thus, the bar will be intermittently coupled to the bit, constituting an acoustical load; and under load, the resonant frequency tends to drop slightly, the effective (or acoustical) length of the resonant bar becomes slightly longer, and the node (or nodes may shift, not substantially with respect to the fixer frame of reference but rather in relation to the transducing bar itself.

In accordance with the concept of the present invention, however, and as shown schematically in FIG. 6a, the node of the bar is allowed to have a generally undamped movement with respect to the frame of reference, that is, the node may shift somewhat axially yet be substantially restrained, radially, in relation to the housing or frame of reference. The effect is to superimpose a relatively-lower frequency oscillation upon the higher-frequency cyclic elastic deformation of the transducing bar for improved results in certain applications.

Additionally, as shown in FIG. 1, the tool element is biased toward the housing and transducer by the resilient means 29, and hence the nodal portion of the transducing bar will transmit to the tool element forces tending to maintain or promote contact between the tool element and the transducer at the superimposed lower frequency. Such a structural arrangement may be considered as a conventional inelastic mass-spring resonant vibratory system wherein the impacting mass itself comprises a resonant transducer capable of cyclic elastic deformations, and thus the arrangement comprises a hybrid or combination of the principles of elastic resonant oscillatory systems with those of conventional inelastic (or bodily-shake) resonant mass-spring systems.

With reference to FIG. 6b, and in accordance with the structure shown in FIG. 3, the normally-unrestrained rearward end of the bar engages an adjustable abutment 32 during its cyclic elastic deformation; and in accordance with the generally undamped mounting of the transducer nodal portion, the effect of this deliberate abutment is to displace the entire transducer bar forwardly and thus increase the velocity of repeated impacts against the tool element. Such an arrangement is particularly advantageous when the sonic tool is intended for masonry drilling operations.

The schematic illustration of the embodiment shown in FIG. 4, wherein the normally-unrestrained end of the bar is secured to the housing, is provided by FIG. 6c. Similarly to FIG. 6b, the restraint (or abutment) is provided on the outer periphery of the normally-unrestrained rearward end portion of the transducing bar, experience having indicated that restraints (or abutments) along the central portion may tend to provide undesirable interferences from an acoustical standpoint.

Obviously, many modifications may be made without departing from the basic spirit of the present invention; and accordingly, within the scope of the appended claims, the invention may be practiced other than has been specifically described herein.

I claim:

1. A sonic tool comprising a housing, a work-engaging tool element having a first portion extending within the housing and further having a second portion in abutting engagement with the housing, a transducer means within the housing, the transducer means exhibiting cyclic elastic deformation and being adapted for delivering vibratory energy to the tool element, the transducer means having at least one nodal portion, and means mounting the transducer means within the housing, substantially at its nodal portion, to accommodate a generally undamped movement of the nodal portion relative to the housing, and in the direction of cyclic elastic deformation of the transducer means, during operation of the tool.

2. The sonic tool of claim 1, wherein the means mounting the nodal portion of the transducer means for generally undamped movement relative to the housing, comprises a bearing cage mounted on the transducer, a plurality of anti-friction bearing elements mounted in the cage, and an internal annular recess formed in the housing to receive the bearing elements, said recess having an axial length greater than that of the bearing elements.

3. The sonic tool of claim 1, wherein the housing has a rearward wall with a bearing guide mounted therein, and wherein the transducer means has a rearward portion slidably mounted in said bearing guide.

4. The sonic tool of claim 1, wherein resilient means is provided between the tool element and the nodal portion of the transducer means.

5. The sonic tool of claim 1, wherein resilient means is provided between the tool element and the housing for the tool.

6. The sonic tool of claim 1, wherein the transducer means is of the piezoelectric type.

7. The sonic tool of claim 1, wherein a means is provided for turning the tool element during operation of the sonic tool.

8. In a sonic tool having a housing, a transducer within the housing, said transducer exhibiting cyclic elastic deformation and having an intermediate substantially nodal portion, and means mounting the nodal portion for accommodating a generally undamped movement of the nodal portion relative to the tool housing, and in the direction of the cyclic elastic deformation of the transducer, during operation of the tool.

9. In a sonic apparatus having a frame, a resonant means including a transducer exhibiting cyclic elastic deformation, said transducer having at least one portion substantially at an acoustical node, and means mounting the node to the frame for a generally undamped movement of the node relative to the frame, thereby superimposing a relatively-lower frequency oscillation upon the higher-frequency cyclic elastic deformation of the transducer.

10. In a sonic tool having a housing, a half-wave transducer within the housing, the transducer being energized by at least one piezoelectric-type transducer element and having an intermediate portion substantially at an acoustical node adjacent to the transducer element, and means mounting the node of the transducer for movement relative to the housing of the tool.

11. A sonic tool comprising a housing, a tool element having a portion extending within the housing, a transducer mounted within the housing and exhibiting cyclic elastic deformation, thereby delivering intermittent vibratory-type impacts to the tool element, the transducer having a substantially nodal portion mounted for generally undamped movement relative to the housing in the direction of cyclic elastic deformation of the transducer, and the housing having a rearward wall with abutment means carried thereon for abutting engagement with the rearward portion of the transducer during its cyclic elastic deformation, thereby increasing the velocity of the impacts to the tool element.

12. The sonic tool of claim 11, wherein said abutment means is adjustable in the direction of the cyclic elastic deformation of the transducer.

13. The sonic tool of claim 11, wherein the tool element further has a collar portion in abutting engagement with the tool housing.

14. The sonic tool of claim 11, wherein resilient means is provided between the tool element and the nodal portion of the transducer.

15. The sonic tool of claim 11, wherein resilient means is provided between the tool element and the housing for the tool.

16. A sonic tool comprising a housing, a tool element having a portion extending within the housing, a transducer mounted within the housing and exhibiting cyclic elastic deformation, thereby delivering intermittent vibratory-type impacts to the tool element, the transducer having an intermediate substantially nodal portion mounted for generally undamped movement relative to the housing in the direction of cyclic elastic deformation of the transducer, and the transducer further having a rearward end portion fixed to the housing, thereby increasing the velocity of the impacts to the tool element.

17. An inelastic mass-spring resonant vibratory system including at least one mass member, which mass member comprises an elastic resonant oscillatory system exhibiting cyclic elastic deformations.

18. The vibratory system of claim 17, wherein said mass member further comprises the impacting mass of a sonic tool.

19. A sonic tool comprising a housing provided with a handle adapted to be grasped by the operator, the housing having a forward wall, a flanged bearing bushing loosely mounted in the wall, spring means constantly urging the bushing rearwardly into the housing and against the wall, a work-engaging tool element mounted within the bushing and in abutment with the flange on the bushing, the tool element having a portion extending rearwardly into the housing, and a sonic transducer within the housing for delivering a series of vibratory impacts to the rearwardly-extending portion of the tool element, the transducer and the tool element being positioned axially, in their mean positions with respect to each other, for optimum transfer of vibratory energy from the transducer to the tool element, and the forward thrust by the operator being exerted on the handle to the housing, and form the housing to the flanged bearing bushing to the tool element, and thus to the work.

20. The sonic tool of claim 19, wherein the bearing bushing is rotatably mounted in the housing wall and has a rotatable connection with the spring means, the tool element and the bearing bushing being interlocked for rotation in unison, and wherein means are provided for rotating the bushing and tool element.

21. The sonic tool of claim 19 wherein said transducer is mounted in means permitting generally undamped motion over a limited distance in the direction of cyclic deformation of said transducer.

References Cited

UNITED STATES PATENTS

| | | | |
|---|---|---|---|
| 1,117,884 | 11/1914 | Montgomery | 173—131 |
| 1,966,446 | 7/1934 | Hayes | 175—56 |
| 2,818,686 | 1/1958 | Weiss | 175—56 |
| 2,967,302 | 1/1961 | Loveless | 173—133 |
| 3,368,085 | 2/1968 | McMaster et al. | 310—9.1 |
| 3,394,274 | 7/1968 | Jacke et al. | 310—9.1 |

JAMES A. LEPPINK, Primary Examiner

U.S. Cl. X.R.

175—56; 310—9.1